（12）United States Patent
Kleiner et al.

(10) Patent No.: US 6,909,854 B1
(45) Date of Patent: Jun. 21, 2005

(54) METHODS AND APPARATUS FOR BEAM SHAPING IN OPTICAL WIRELESS COMMUNICATIONS SYSTEM

(75) Inventors: Norbert Kleiner, Scottsdale, AZ (US); Diana C. Chen, Gilbert, AZ (US); James W. Bishop, Jr., Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 635 days.

(21) Appl. No.: 09/650,927

(22) Filed: Aug. 29, 2000

(51) Int. Cl.[7] .......................... H04B 10/04; H04B 10/00
(52) U.S. Cl. ...................... 398/201; 398/118
(58) Field of Search .............................. 398/201, 118, 398/131; 359/619, 620, 621; 372/19

(56) References Cited

U.S. PATENT DOCUMENTS

| | | | | |
|---|---|---|---|---|
| 5,745,511 A | * | 4/1998 | Leger | 372/19 |
| 5,757,523 A | * | 5/1998 | Wood et al. | 359/15 |
| 5,844,727 A | * | 12/1998 | Partlo | 359/710 |
| 5,864,430 A | * | 1/1999 | Dickey et al. | 359/559 |
| 6,049,593 A | * | 4/2000 | Acampora | 379/56.2 |
| 6,183,092 B1 | * | 2/2001 | Troyer | 353/31 |
| 6,239,913 B1 | * | 5/2001 | Tanaka | 359/619 |
| 6,246,524 B1 | * | 6/2001 | Tanaka | 359/619 |
| 6,526,079 B1 | * | 2/2003 | Watterson et al. | 372/32 |
| 6,529,675 B1 | * | 3/2003 | Hayden et al. | 385/141 |
| 6,548,781 B1 | * | 4/2003 | Brunwinkel | 219/121.73 |

OTHER PUBLICATIONS

P. Eardley et al., "Holograms for Optical Wireless LANS", IEE Proc.–Optoelectron, vol. 143, No. 6, Dec. 1996.*
M. Lehman, "Angular Shift by Reflection for Super–Gaussian Beams", SBMO/IEEE MTT–S IMOC '97 Proceedings, 1997.*

* cited by examiner

Primary Examiner—Jason Chan
Assistant Examiner—Shi K. Li
(74) Attorney, Agent, or Firm—Ingrassia, Fisher & Lorenz, P.C.

(57) ABSTRACT

An optical wireless communications system (1) comprises a server or transceiver hub (6) transmitting and/or receiving optical communications with geographically dispersed subscriber units (8) via optical beams. The transceiver hub (6) transmits a beam pattern that has an efficient, rectangular, flat-topped far field optical profile, thus permitting less complex and less expensive transceiver equipment to be employed in the transceiver hub (6) and in the subscriber units (8). In one embodiment, the transceiver hub (6) comprises an optical source (52, FIG. 3), an asymmetrical lens such as a cylindrical lens (60, FIG. 3), and a diffraction element such as a diffractive phase plate (65, FIG. 3). Various methods of shaping an optical transmission profile are also described.

20 Claims, 3 Drawing Sheets

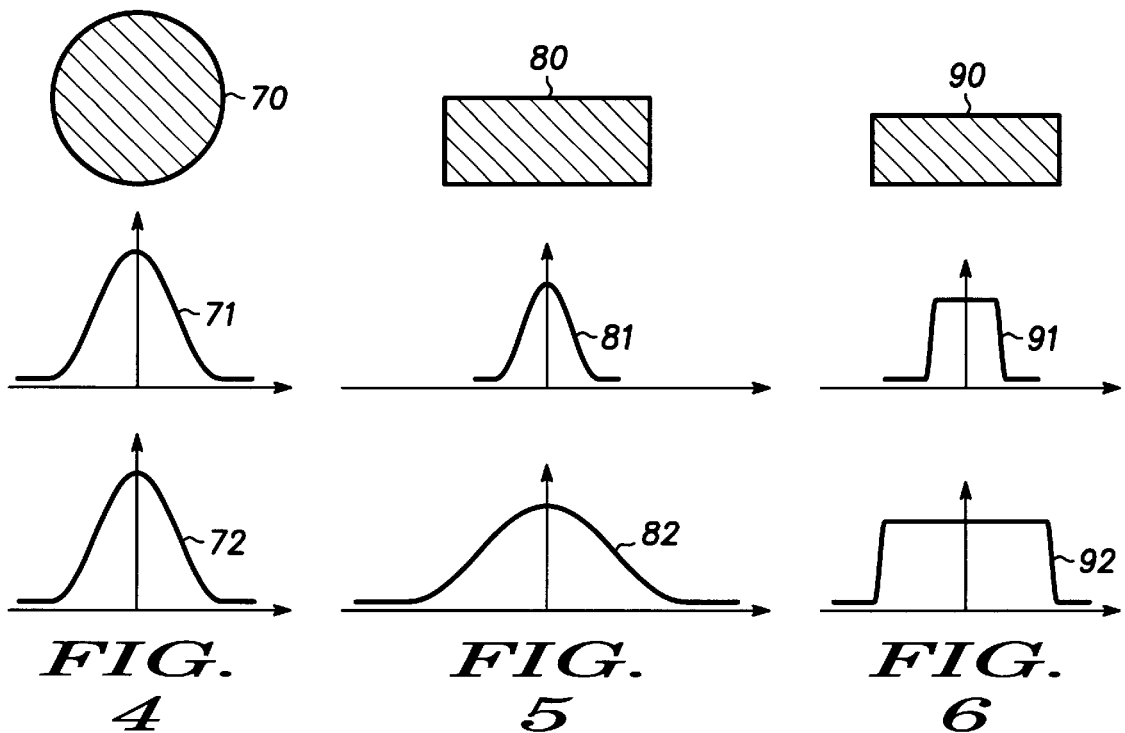
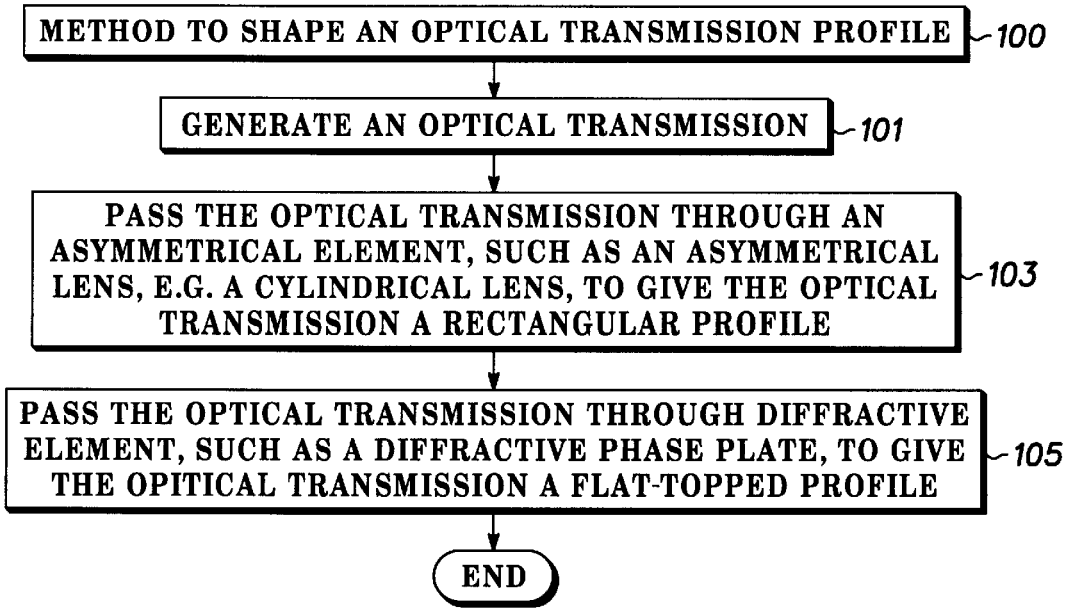

METHODS AND APPARATUS FOR BEAM SHAPING IN OPTICAL WIRELESS COMMUNICATIONS SYSTEM

FIELD OF THE INVENTION

This invention relates generally to communications systems and, in particular, to methods and apparatus for beam shaping in an optical wireless communications system.

BACKGROUND OF THE INVENTION

There is an ever increasing demand for communications infrastructure that can support inexpensive, high-speed communications to every residential and business address that desires it. As one example, the use of the Internet for commerce, education, entertainment, communications, and many other purposes is quickly developing. There is likewise an increasing interest in providing entertainment and other services to residential and business customers that require moving large amounts of data very quickly, i.e. that have high bandwidth requirements, such as video-on-demand, high fidelity audio, high definition television, computer software, documents, medical X-ray charts, digital photography, and the like.

It is well known to implement the needed communications infrastructure by interconnecting communications nodes using wires and cables. However, cabling is expensive and time-consuming to deploy, and it has not been able to fulfill the expanding demand for high-speed communications services.

Wireless communications systems provide a relatively low cost alternative to wire-based communications networks, and they are quicker to deploy. One known wireless network architecture is the wireless local network having one or more base stations or server nodes distributed throughout a region of system users. Each system user has wireless equipment for communicating bi-directionally with a server node. This type of wireless network is sometimes referred to as a "last mile" network, because information content can be distributed from a high bandwidth source by cable to a server node that is in the neighborhood of the system user and then distributed the "last mile" via a wireless link between the server node and the system user's equipment.

The known optical wireless local networks comprise one or more optical transmitters at a server node. The optical transmitter is generally paired with an optical receiver for receiving optical communications sent to the server node from subscriber's equipment. Pairs of the known optical transmitters and receivers handle communications over a certain angle of coverage of the subscriber area. Generally the angle of coverage is dependent upon the distance from the server node to the furthest receivers. The angle of coverage can thus be a few degrees, e.g. 5 to 10 degrees, for a subscriber area that includes distant subscribers, or it can be relatively large, e.g. 30 to 45 degrees, for a subscriber area that doesn't have any distant subscribers.

Each optical transmitter must have sufficient signal transmission power to cover all subscriber receivers within the angle of coverage out to a certain distance from the server node. In general, the higher the transmission power required of the server node's optical transmitter, the more complex and expensive the components of the optical transmitter must be. Correspondingly, the lower the field strength of the optical signal received at a subscriber's receiver, the more complex and expensive must be the components of the subscriber receiver.

Accordingly, there is a significant need for methods and apparatus that can substantially improve transmitter signal strength in an optical wireless communications system without substantially increasing the complexity and cost of the optical transmitter.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 4 depicts a cross-section of an optical wavefront at a distance z from an optical transmitter without the beam shaping apparatus of the present invention;

FIG. 5 depicts a cross-section of an optical wavefront at a distance z from an optical transmitter having a cylindrical lens without the diffractive element of the beam shaping apparatus of one embodiment of the present invention;

FIG. 6 depicts a cross-section of an optical wavefront at a distance z from an optical transmitter of one embodiment of the present invention; and FIG. 7 shows a flow chart for a method to shape an optical transmission profile of an optical wireless transmitter, according to one embodiment of the invention.

DETAILED DESCRIPTION OF THE DRAWINGS

Figure 1:
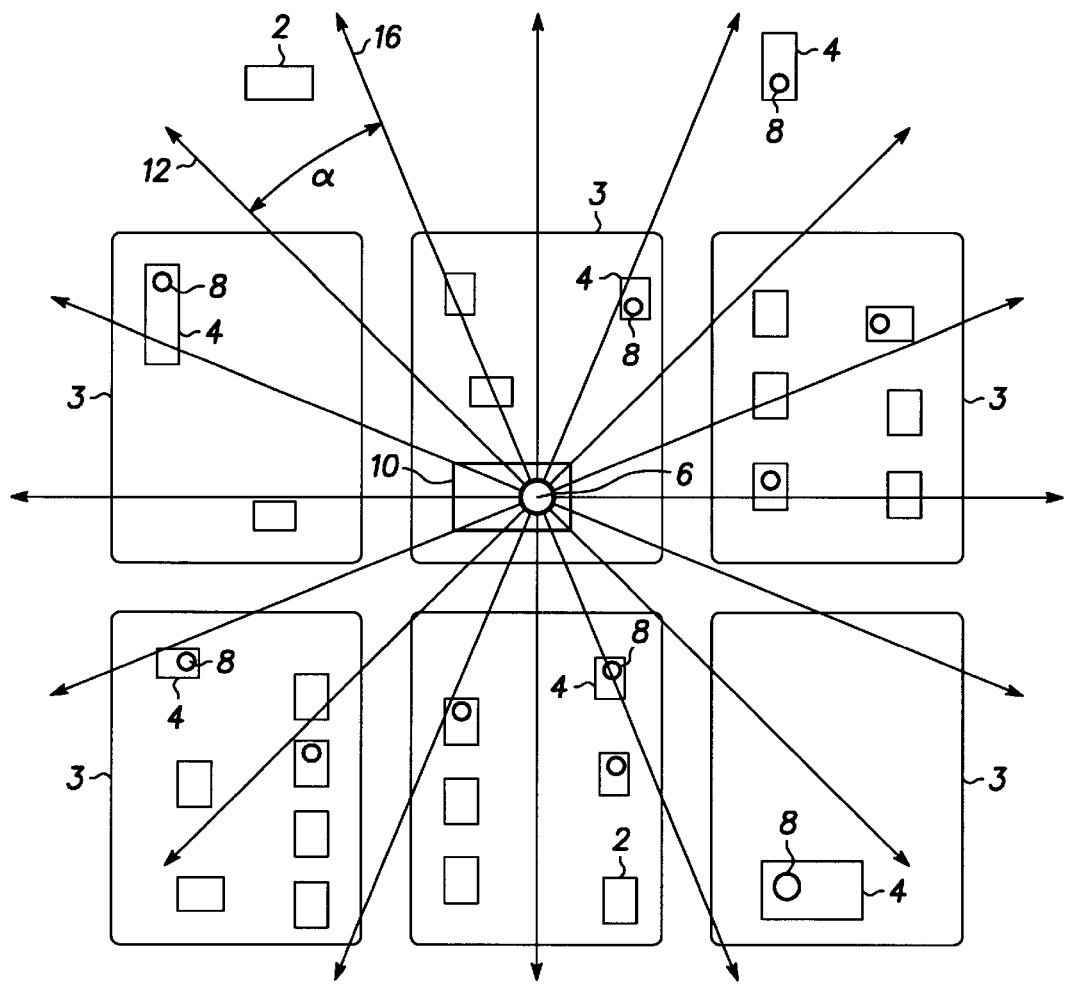
FIG. 1 depicts a simplified diagram of a wireless communications system, including an optical wireless local network, with which the present invention may be practiced.

FIG. 1 depicts a simplified diagram of a wireless communications system, including an optical wireless local network 1, with which the present invention may be practiced. The present invention can be used with any local or regional wireless network. In the embodiment depicted in FIG. 1, wireless local network 1 can be used to provide a basic communications system where no infrastructure presently exists, without the significant expense and time required to install copper or fiber optic cabling throughout a community. Wireless local network 1 can also be used to supplement an existing communications system. Wireless local network 1 can readily adapt itself to sudden and rapid surges in subscriber demand for broadband services.

Even more significantly, wireless local network 1 is an optical wireless network that transmits data at high speed using one or more light beams rather than conventional radio frequency (RF) beams. Thus it can transmit data at much higher bandwidth and much higher data rates than RF wireless networks. In addition, implementing an optical wireless network, or "optical wireless access system" as it is sometimes referred to in the art, generally does not require the expensive and time-consuming process of obtaining a spectrum license from a governmental communications authority. The simplicity and modularity of an optical wireless access system enables a communications carrier to relatively easily expand its capacity as customer demand increases. Such a system is relatively easily upgradable and scalable to high capacity without producing electromagnetic interference, which can be sometimes produced by RF communications networks.

In one embodiment, optical wireless local network 1 comprises a transceiver hub 6 on a suitably sited structure 10, such as a building, tower, geographical promontory, or the like. Situated around transceiver hub 6 are a plurality of structures 2 of potential customers, as well as a plurality of structures 4 of existing customers. Most of structures 2 and 4 are depicted as located in city blocks 3; however, the way in which structures 2 and 4 are grouped is not material to the invention.

Structures 2 and 4 can be, for example, houses, offices, schools, and any other type of structure requiring broadband communications service. Each customer structure 4 further includes equipment often referred to in the art as "customer premises equipment" or as a "subscriber unit", which equipment comprises at least one transceiver unit 8.

As used herein, "customer premises equipment" (CPE) or a "subscriber unit" (SU) is defined to mean any optical wireless transceiver unit that is used by a customer or subscriber. A CPE or SU is typically coupled to a customer's computer and/or communications equipment, such as a personal computer, telephone, entertainment equipment such as a television, monitoring equipment, or any other type of computing and/or communications equipment.

While in one embodiment of the present invention a CPE or SU is located in or on a customer's structure, in other embodiments it can take the form of mobile or portable devices capable of line-of-sight one-way or two-way wireless communications with the system's transceiver hub 6.

It is an important feature of the present invention that the transceiver hub 6 is made more power efficient and, accordingly, that the required dynamic range of transceiver units 8 in the optical wireless local network can be reduced, resulting in receiver units that are less complex, less expensive, and potentially more commercially acceptable to broadband customers.

Transceiver hub 6 generally communicates over line-of-sight transmission paths with the CPE transceivers 8. In one embodiment, shown in FIG. 1, transceiver hub 6 employs a geographically segmented multiple access scheme. Transceiver hub 6 communicates with CPE transceivers 8 in a plurality of individual geographical segments, such as the segment defined by angle α of arc 14 that lies between radial line segments 12 and 16. Transceiver hub 6 has one or more optical transceivers (not shown) that divide the area into a plurality of segments. The segments need not necessarily be of the same depth, height, or angular width. They can be sized according to subscriber demand, geographical features such as the presence of tall buildings or hills, climate attributes such as prevalent fog or steam, changes in foliage, changes in demand or in signal blockage over time, and/or any other appropriate attributes.

Wireless local network 1 further can further include additional transceiver hubs (not shown) that are coupled to transceiver hub 6. Some CPE transceivers 8 can be served by more than one transceiver hub 6. Transceiver hub 6 can be coupled to the Internet and/or other communications networks that are external to local wireless local network 1. For example, transceiver hub 6 can be coupled via wireless or cable link to another terrestrial communications node, and/or it can be coupled via a wireless link to a satellite.

Figure 2:
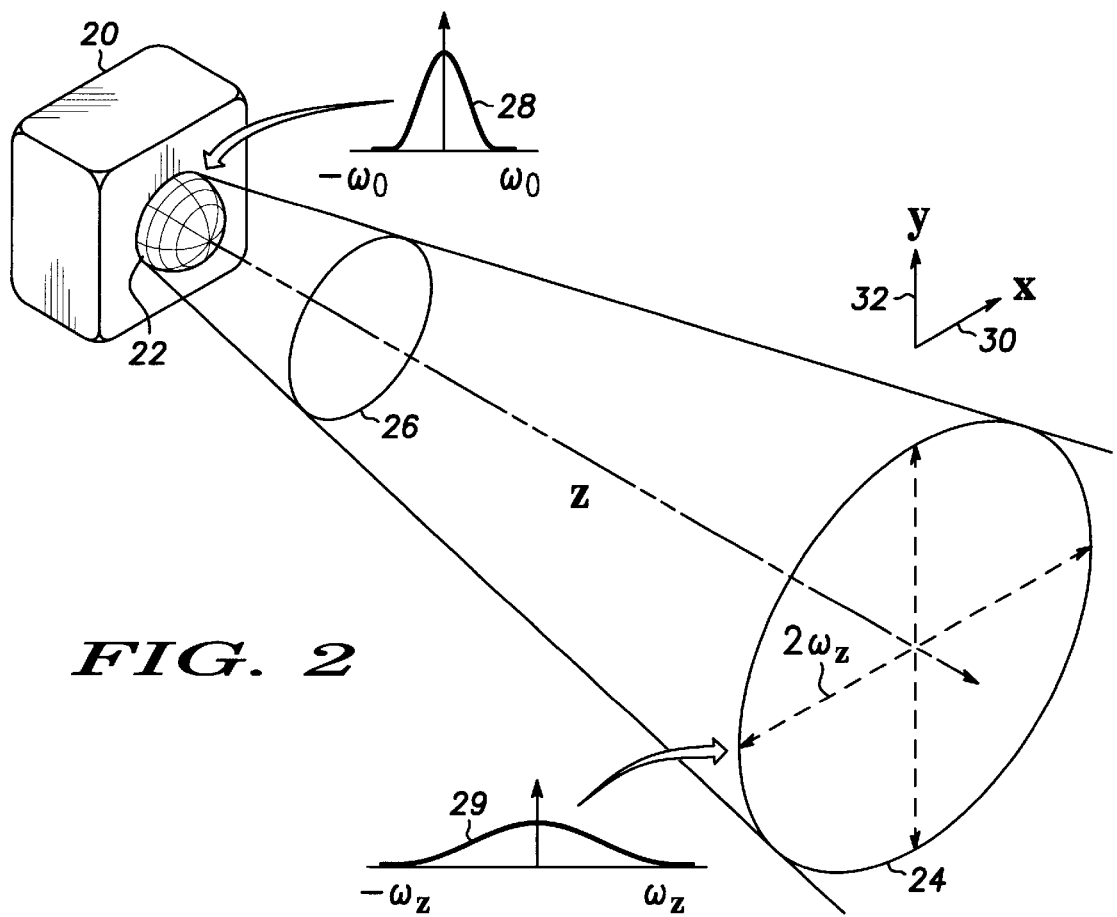
FIG. 2 is a diagram depicting how the electromagnetic field strength of a circular symmetric optical beam that is being transmitted by an optical source varies over a region through which the beam is propagated.

FIG. 2 is a diagram depicting how the electromagnetic field strength of a circular symmetric optical beam 26 that is being transmitted by an optical source 20 varies over a region 24 through which the beam is propagated. Optical source 20 can be a laser with a circular exit pupil 22.

Beam 26 comes out of exit pupil 22 and propagates in the z direction. Beam 26 is assumed to be circular in profile. The electromagnetic field strength of beam 26 decreases in the z direction, and the width of beam 26 increases in the z direction.

At the exit pupil 22 of optical source 20, beam 26 has a relatively large amplitude 28 and a relatively narrow half-width $\omega_0$.

At distance z from optical source 20, beam 26 has a relatively small amplitude 29 and a relatively large half-width $\omega_z$.

The electromagnetic field strength E of the optical beam 26 emitted by the laser source 20 is given by Equation 1:

$$E \propto E_0 \frac{\omega_0}{\omega(z)} \exp\left[-\frac{x^2+y^2}{\omega^2(z)}\right] \quad \text{Equation (1)}$$

wherein $E_0$ is the electromagnetic field strength at the optical source 20, assuming a minimum spot size;

$\omega_0$ is the Gaussian beam half-width at the exit pupil 22;

$\omega(z)$ is the Gaussian beam half-width at a distance z from the optical source 20, again assuming a minimum spot size, and assuming no beam-forming elements are used to make the beam diverge or converge;

x is the distance along the x direction 30 of region 24;

y is the distance along the y direction 32 of region 24; and exp is the exponential function.

The expression $\omega(z)$ can be expressed further by Equation 2:

$$\omega(z) = \omega_0 \sqrt{1 + \left(\frac{\lambda z}{\pi \omega_0^2 n}\right)^2} \quad \text{Equation (2)}$$

wherein λ is the wavelength of the light; and n is the index of refraction in the transmission medium (n=1 for air).

Where beam 26 intersects distant region 24 we would like to determine how its electromagnetic field strength varies along the x and y directions of region 24. This is referred to in the art as a "far field optical profile" of the optical beam.

$E_x$, representing the electromagnetic field strength along the x direction 30 of region 24 is given by Equation 3:

$$E_x \propto E_0 \frac{\omega_{y0}}{\omega_y(z)} \exp\left[-\frac{x^2+y^2}{\omega_y^2(z)}\right] \quad \text{Equation (3)}$$

wherein $\omega_x(z)$ is the Gaussian beam half-width at a distance z from the optical source 20;

wherein $\omega_{x0}$ is the Gaussian beam half-width along the x direction when the wave front has zero curvature; and N is an exponential value that can be adjusted to provide a desired far field optical profile.

$E_y$, representing the electromagnetic field strength along the y direction 32 of region 24, is given by Equation 4:

$$E_y \propto E_0 \frac{\omega_{x0}}{\omega_x(z)} \exp\left[-\frac{x^2+y^2}{\omega_x^2(z)}\right]^N \quad \text{Equation (4)}$$

wherein $\omega_y(z)$ is the Gaussian beam half-width at a distance z from the optical source 20;

wherein $\omega_{y0}$ is the Gaussian beam half-width along the y direction when the wave front has zero curvature; and N is an exponential value that can be adjusted to provide a desired far field optical profile.

FIG. 4 depicts a cross-section of an optical wavefront 70 at a distance z from an optical transmitter without the beam shaping apparatus of the present invention. "z" represents the distance between the optical transmitter and a target receiver. Profile 70 is circular symmetric. The electromagnetic field strength $E_x$ along the x direction 30 of region 24 (FIG. 2) varies essentially in a Gaussian manner as indicated by curve 72. Similarly, the electromagnetic field strength $E_y$ along the y direction 32 of region 24 (FIG. 2) varies essentially in a Gaussian manner as indicated by curve 71.

Generating a circular symmetric beam profile 70 requires high power optical transmitters due to the mismatch of the beam profile 70 to the far field optical profile of the target subscriber region, which is generally rectangular in shape. That is, when a circular symmetric beam is being transmitted to a target subscriber region that is basically rectangular in profile, a significant amount of transmitter power is wasted in transmitting outside of the target subscriber region.

High power optical transmitters can potentially cause eye safety problems at the transceiver hub, requiring extra expense and safety precautions. High power optical transmitters are also relatively expensive to manufacture and to maintain. In addition, the inefficiencies of a circular symmetric beam profile require that subscriber receivers have expensive optical receivers that are capable of handling optical signals arriving within a large dynamic range.

Thus it is desired to reshape the far field optical profile into a super-Gaussian profile having a "flat-top" profile.

Figure 3:
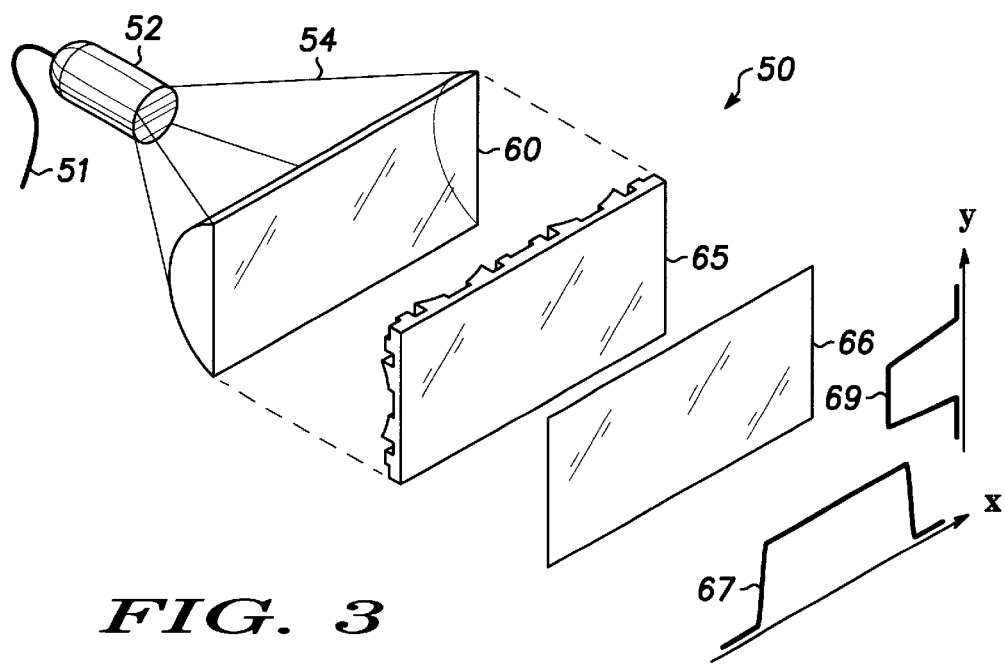
FIG. 3 depicts a diagrammatic view of beam shaping apparatus suitable for use in one embodiment of the present invention.

FIG. 3 depicts a diagrammatic view of beam shaping apparatus 50 suitable for use in one embodiment of the present invention. Beam shaping apparatus 50 comprises a light transmission medium, such as a single-mode (SM) fiber optic cable 51, coupled to an optical transmission source 52. Optical transmission source 52 usually comprises an optical amplifier (not shown).

Optical transmission source 52 generates an optical beam 54 to an asymmetrical lens, such as cylindrical lens 60. Cylindrical lens 60 changes the otherwise symmetrical beam profile into an asymmetrical beam profile that better matches the desired subscriber target region. A suitable cylindrical lens 60 is commercially available from Melles Griot, Irvine, Calif. A lens from either the 01LCP or 01 LCN series of Melles Griot lenses can be used. However, the invention is not limited to the above-mentioned lenses. Other types of aspherical lens producing an asymmetric beam profile can also be used.

FIG. 5 depicts a cross-section of an optical wavefront 80 at a distance z from an optical transmitter having a cylindrical lens 60 (without any diffraction plate 65) of the beam shaping apparatus of one embodiment of the present invention. Again, "z" represents the distance between the optical transmitter and a target receiver.

Although profile 80 is rectangular, the electromagnetic field strength $E_x$ along the x direction at a receiver site still varies essentially in a Gaussian manner as indicated by curve 82. Similarly, the electromagnetic field strength $E_y$ along the y direction at a receiver site still varies essentially in a Gaussian manner as indicated by curve 81.

Returning to FIG. 3, beam shaping apparatus 50 further comprises a diffractive element, such as diffractive phase plate 65. Diffractive phase plate 65 changes the asymmetrical beam profile coming out of cylindrical lens 60 into a flat-topped beam profile which is not Gaussian. A suitable diffractive phase plate 65 is commercially available from Physical Optics, Los Angeles, Calif. or from Digital Optics, Charlotte, N.C. However, the invention is not limited to any particular type of diffractive phase plate.

FIG. 6 depicts a cross-section of an optical wavefront 90 at a distance z from an optical transmitter of one embodiment of the present invention. Again, "z" represents the distance between the optical transmitter and a target receiver.

The electromagnetic field strength $E_x$ along the x direction of profile 90 as seen at a receiver site is essentially rectangular and flat-topped, as indicated by curve 92. Similarly, the electromagnetic field strength $E_y$ along the y direction of profile 90 at a receiver site is essentially rectangular and flat-topped, as indicated by curve 91.

Returning to FIG. 3, the flat-topped far field optical profile 66 is again seen. The electromagnetic field strengths 67 and 69 along the x and y directions, respectively, of profile 66 are again depicted, and they are essentially identical to, those previously described with reference to FIG. 6.

With reference to Equations 3 and 4 again, when N is 2, the far field optical profile is Gaussian, so N should be larger than 2. In a preferred embodiment, N=8 produces an acceptable flat-topped beam profile. However, N can be used as high as 20 and still produce an acceptable flat-topped beam profile. As N increases, the lines in the diffractive phase plate 65 must be more closely spaced, generally increasing the cost of the diffractive phase plate. In general, what is desired is to produce a far field optical profile in which $E_x \gg E_y$.

As mentioned earlier, it is an advantage of the beam shaping apparatus 50 that the optical transmitter can be less complex and less powerful. The diffractive phase plate 65 corrects certain kinds of optical aberrations, such as spherical and coma aberrations. These kinds of aberrations would contribute to loss of optical power and require a more complex CPE that has a more sensitive optical receiver. However, in a system employing the present invention, the subscribers' optical receivers can be made of generally less complex and less expensive components. Thus a system utilizing the present invention has a greater potential to become commercially accepted by broadband service providers and users.

It will be understood by those of ordinary skill in the art that the various elements illustrated in FIG. 3 are merely representational and are not drawn to scale. Certain proportions thereof may be exaggerated, while others may be minimized. The drawings are intended to illustrate various implementations of the invention, which can be understood and appropriately carried out by those of ordinary skill in the art. Any arrangement, which is calculated to achieve the same purpose, may be substituted for the specific embodiment shown.

FIG. 7 shows a flow chart for a method 100 to shape an optical transmission profile of an optical wireless transmitter, according to one embodiment of the invention.

In 101, an optical transmission is generated, for example by optical transmission source 52 (FIG. 3).

In 103, the optical transmission is passed through an asymmetrical element such as an asymmetrical lens. In one embodiment, the asymmetrical lens is a cylindrical lens 60 (FIG. 3). After passing through the asymmetrical element, the optical transmission has a rectangular profile.

In 105, the optical transmission is passed through a diffractive element, such as a diffractive phase plate 65 (FIG. 3). After passing through the diffractive element, the optical transmission has a rectangular, flat-topped profile. The method ends at 107.

It will be understood by those skilled in the art that the operations of the method shown and described herein can be carried out in a different order than those described with reference to FIG. 7. It will also be understood that while the flowchart has an "End" block, in general the method that it depicts is continuously performed. The particular operations depicted in FIG. 7 are merely illustrative of one embodiment of the invention, and other implementations will be apparent to those of ordinary skill in the art.

CONCLUSION

What has been described is a free space optical communication system that can be used for terrestrial and/or satellite communication. The beam shaping apparatus and methods of the present invention significantly reduce the system cost and improve the system performance, so that optical wireless systems can be used for commercial applications. The present invention can significantly increase the power efficiency of optical transmitters and reduce the complexity of optical receivers in subscriber equipment, thus potentially reducing the costs of manufacturing such equipment.

The beam shaping apparatus and methods described herein are quite versatile and can be implemented in any type of optical wireless network. For example, they can be used in subscriber equipment and in relay nodes as well as in server nodes. As described herein, the advantages of the present invention will be apparent to those of skill in the art and will provide improved systems and methods for transmitting optical communications in optical wireless networks, including optical wireless access systems.

Those skilled in the art will appreciate that the particular structure of the beam shaping apparatus is a matter of design choice and that beam shaping apparatus and methods can be implemented in other ways that will be apparent in view of the description of the function and operation of the beam shaping apparatus and methods contained herein.

While the invention has been described in terms of specific examples, it is evident that many alternatives and variations will be apparent to those skilled in the art based on the description herein, and it is intended to include such variations and alternatives in the claims.

What is claimed is:

1. A method of shaping an optical communication transmission in a wireless communication system, the method comprising:

shaping a circular profile optical communication transmission to produce a first beam having a first rectangular beam profile and a first far-field profile having Gaussian electromagnetic field strength components in both an x-direction and a y-direction and both orthogonal to a direction of propagation of the optical communication transmission; and shaping the first beam to produce a second beam having a second rectangular profile and a second far-field profile having flat-topped electromagnetic field strength components in both the x-direction, $E_x$, and the y-direction, $E_y$;

wherein $E_x$ and $E_y$ are both proportional to an exponential of a Gaussian distribution.

2. The method of shaping recited in claim 1, wherein $$E_x \propto E_0 \frac{\omega_{x0}}{\omega_x(z)} \exp\left[-\frac{x^2+y^2}{\omega_x^2(z)}\right]^N;$$

wherein $$E_y \propto E_0 \frac{\omega_{y0}}{\omega_y(z)} \exp\left[-\frac{x^2+y^2}{\omega_y^2(z)}\right]^N; \text{ and}$$

wherein $E_0$ is an electromagnetic field strength of an optical source of the optical communication transmission, x is a distance along the x-direction of a target region, y is a distance along the y-direction of the target region, exp is an exponential function, $\omega_x(z)$ is a Gaussian beam half-width along the y-direction at a distance z from the optical source, $\omega_y(z)$ is a Gaussian beam half-width along the x-direction at a distance z from the optical source, $\omega_{x0}$ is a Gaussian beam half-width along the x-direction at the optical source, $\omega_{y0}$ is the Gaussian beam half-width along the y-direction at the optical source, and N is an exponential value such that $2 < N \leq 20$.

3. The method of shaping recited in claim 2, wherein N is approximately eight (8).

4. The method of shaping recited in claim 2, wherein $E_x$ is greater than $E_y$.

5. A method of shaping an optical communication transmission far-field profile of a circular profile optical transmission produced by an optical transmitter in an optical wireless communication system, the method comprising:

shaping the optical communication transmission through a cylindrical lens into a first beam having a first rectangular profile and a first far-field profile having Gaussian electromagnetic field strength components in both an x-direction and a y-direction at a distance greater than fifteen (15) meters and both orthogonal to a direction of propagation of the optical transmission; and shaping the first beam through a diffractive phase plate into a second beam having a second rectangular profile and a second far-field profile having flat-topped electromagnetic field strength components in both the x-direction, $E_x$, and the y-direction, $E_y$, at a distance greater than fifteen (15) meters;

wherein $E_x$ and $E_y$ are both proportional to an exponential of a Gaussian distribution.

6. The method of shaping recited in claim 5 wherein $$E_x \propto E_0 \frac{\omega_{x0}}{\omega_x(z)} \exp\left[-\frac{x^2+y^2}{\omega_x^2(z)}\right]^N;$$

wherein $$E_y \propto E_0 \frac{\omega_{y0}}{\omega_y(z)} \exp\left[-\frac{x^2+y^2}{\omega_y^2(z)}\right]^N; \text{ and}$$

wherein $E_0$ is an electromagnetic field strength of an optical source of the optical communication transmission, x is a distance along the x-direction of a target region, y is a distance along the y-direction of the target region, exp is an exponential function, $\omega_x(z)$ is a Gaussian beam half-width along the y-direction at a distance z from the optical source, $\omega_y(z)$ is a Gaussian beam half-width along the x-direction at a distance z from the optical source, $\omega_{x0}$ is a Gaussian beam half-width along the x-direction at the optical source, $\omega_{y0}$ is the Gaussian beam half-width along the y-direction at the optical source, and N is an exponential value such that $2 < N \leq 20$.

7. The method of shaping recited in claim 6 wherein said first beam shaping step comprises the step of creating the second beam characterized by N approximately equal to eight (8).

8. The method of shaping recited in claim 6 wherein said first beam shaping step comprises the step of creating the second beam characterized by $E_x$ grater than $E_y$.

9. An optical communication transmitter for a wireless communication system, said transmitter comprising:

a optical source configured to generate an optical communication beam;

an asymmetrical lens configured to receive the optical communication beam from the optical source and shape the optical communication beam to have a first rectangular profile and a first far-field profile having Gaussian electromagnetic field strength components in both an x-direction and a y-direction and both orthogonal to a direction of propagation of the optical beam; and a diffractive element configured to receive the optical communication beam from the asymmetrical lens and shape the optical communication beam to have a second rectangular profile and a second far-field profile having flat-topped electromagnetic field strength components in both the x-direction, $E_x$, and the y-direction, $E_y$;

wherein $E_x$ and $E_y$ are both proportional to an exponential of a Gaussian distribution.

10. The optical transmitter recited in claim 9 wherein $$E_x \propto E_0 \frac{\omega_{x0}}{\omega_x(z)} \exp\left[-\frac{x^2 + y^2}{\omega_x^2(z)}\right]^N ;$$

wherein $$E_y \propto E_0 \frac{\omega_{y0}}{\omega_y(z)} \exp\left[-\frac{x^2 + y^2}{\omega_y^2(z)}\right]^N ; \text{ and}$$

wherein $E_0$ is an electromagnetic field strength of an optical source of the optical communication transmission, x is a distance along the x-direction of a target region, y is a distance along the y-direction of the target region, exp is an exponential function, $\omega_x(z)$ is a Gaussian beam half-width along the y-direction at a distance z from the optical source, $\omega_y(z)$ is a Gaussian beam half-width along the x-direction at a distance z from the optical source, $\omega_{x0}$ is a Gaussian beam half-width along the x-direct on at the optical source, $\omega_{y0}$ is the Gaussian beam half-width along the y-direction at the optical source, and N is an exponential value such that $2 < N \leq 20$.

11. The optical transmitter recited in claim 10 wherein is approximately equal to eight (8).

12. The optical transmitter recited in claim 10, wherein $E_x$ is greater than $E_y$.

13. A beam shaping apparatus for use with an optical communication transmitter in a wireless communication system that generates an optical communication beam having a circular profile comprising:

a cylindrical lens configured to give the optical communication beam a first rectangular profile and a first far-field profile having Gaussian electromagnetic field strength components in both an x-direction and a y-direction and both orthogonal to a direction of propagation of the optical beam; and a diffractive phase plate configured to receive the optical communication beam from the cylindrical lens;

wherein the combination of the cylindrical lens and the diffractive phase plate is adapted to shape the optical communication beam to have a second rectangular profile and a second far-field profile having flat-topped electromagnetic field strength components in both the x-direction and the y-direction at a distance greater than fifteen (15) meters;

wherein $E_x$ and $E_y$ are both proportional to an exponential of a Gaussian distribution.

14. The beam shaping apparatus recited in claim 13 wherein $$E_x \propto E_0 \frac{\omega_{x0}}{\omega_x(z)} \exp\left[-\frac{x^2 + y^2}{\omega_x^2(z)}\right]^N ;$$

wherein $$E_y \propto E_0 \frac{\omega_{y0}}{\omega_y(z)} \exp\left[-\frac{x^2 + y^2}{\omega_y^2(z)}\right]^N ; \text{ and}$$

wherein $E_0$ is an electromagnetic field strength of an optical source of the optical communication transmission, x is a distance along the x-direction of a target region, y is a distance along the y-direction of the target region, exp is an exponential function $\omega_x(z)$ is a Gaussian beam half-width along the y-direction at a distance z from the optical source, $\omega_y(z)$ is a Gaussian beam half-width along the x-direction at a distance z from the optical source, $\omega_{x0}$ is a Gaussian beam half-width along the x-direction at the optical source, $\omega_{y0}$ is the Gaussian beam half-width along the y-direction at the optical source, and N is an exponential value such that $2 < N \leq 20$.

15. The beam shaping apparatus recited in claim 14, wherein N is approximately equal to eight (8).

16. The beam shaping apparatus recited in claim 14, wherein $E_x$ is greater than $E_y$.

17. A wireless communications system comprising:

an optical transmitter to generate a shaped optical communication beam carrying information; and at least one subscriber unit to receive the shaped optical communication beam;

wherein the optical transmitter comprises:

an optical source to generate a first optical communication beam having a circular profile;

an asymmetrical element configured to receive the first optical communication beam from the optical source and shape the first optical beam into a second optical communication beam having a first rectangular profile and a first far-field profile having Gaussian electromagnetic field strength components in both an x-direction and a y-direction and both orthogonal to a direction of propagation of the second optical communication beam; and a diffractive element configured to receive the second optical communication beam from the asymmetrical element, wherein the combination of the asymmetrical element and the diffractive element is adapted to shape the first optical communication beam into the shaped optical beam having a second rectangular profile and a second far-field profile at a distance greater than fifteen (15) meters, the second far-field profile having flat-topped electromagnetic field strength components in both the x-direction, $E_x$, and the y-direction, $E_y$;

wherein $E_x$ and $E_y$ are both proportional to an exponential of a Gaussian distribution.

18. The beam shaping apparatus recited in claim 17, wherein $$E_x \propto E_0 \frac{\omega_{x0}}{\omega_x(z)} \exp\left[-\frac{x^2+y^2}{\omega_x^2(z)}\right]^N;$$

wherein $$E_y \propto E_0 \frac{\omega_{y0}}{\omega_y(z)} \exp\left[-\frac{x^2+y^2}{\omega_y^2(z)}\right]^N; \text{ and}$$

wherein $E_0$ is an electromagnetic field strength of an optical source of the optical communication transmission x is a distance along the x-direction of a target region, y is a distance along the y-direction of the target region, exp is an exponential function, $\omega_x(z)$ is a Gaussian beam half-width along the y-direction at a distance z from the optical source, $\omega_y(z)$ is a Gaussian beam half-width along the x-direction at a distance z from the optical source, $\omega_{x0}$ is a Gaussian beam half-width along the x-direction at the optical source, $\omega_{y0}$ is the Gaussian beam half-width along the y-direction at the optical source, and N is an exponential value such that $2 < N \leq 20$.

19. The beam shaping apparatus recited in claim 18, wherein N is approximately equal to eight (8).

20. The beam shaping apparatus recited in claim 18, wherein $E_x$ is greater than $E_y$.

* * * * *

UNITED STATES PATENT AND TRADEMARK OFFICE
CERTIFICATE OF CORRECTION

PATENT NO. : 6,909,854 B1
DATED : June 21, 2005
INVENTOR(S) : Norbert Kleiner

It is certified that error appears in the above-identified patent and that said Letters Patent is hereby corrected as shown below:

Column 9,
Line 14, change "grater" to -- greater --.
Line 59, change "x-direct on" to -- x direction --.

Column 10,
Line 19, insert -- ,Ex, -- after "x-direction".
Line 19, insert -- ,Ey, -- after "y-direction".
Line 41, insert -- , -- after "function".

Column 12,
Line 9, insert -- , -- after "transmission".

Signed and Sealed this

Seventeenth Day of January, 2006

JON W. DUDAS
*Director of the United States Patent and Trademark Office*